(No Model.)
F. W. MARVIN & G. B. ESSEX.
LUBRICATOR.
No. 479,911. Patented Aug. 2, 1892.
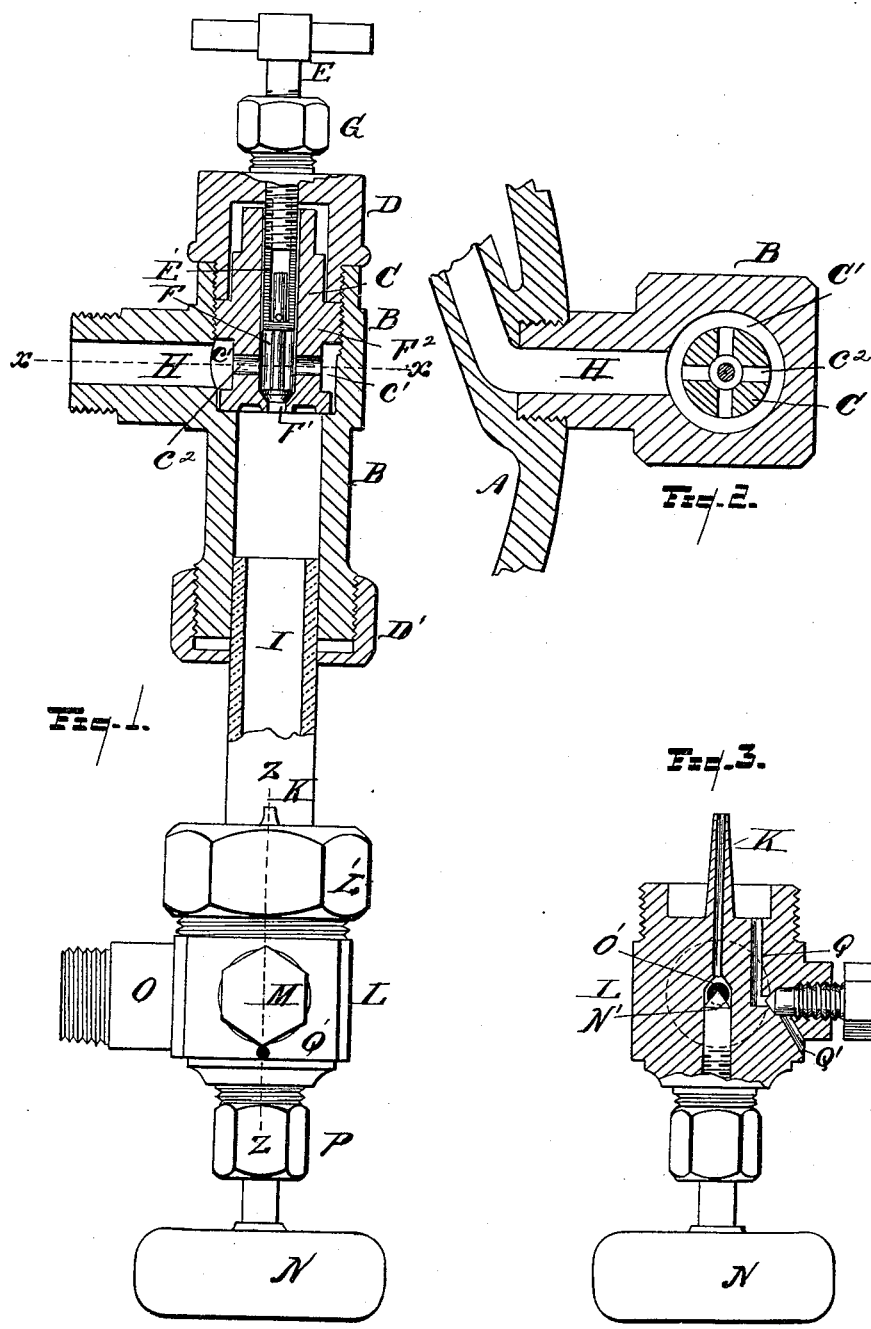
WITNESSES
Samuel E. Thomas
O. W. Prager
INVENTORS
Frank W. Marvin
George B. Essex
by
R. Mason atty

UNITED STATES PATENT OFFICE.

FRANK W. MARVIN AND GEORGE B. ESSEX, OF DETROIT, MICHIGAN, ASSIGNORS TO THE MICHIGAN LUBRICATOR COMPANY, OF SAME PLACE.

LUBRICATOR.

SPECIFICATION forming part of Letters Patent No. 479,911, dated August 2, 1892.

Application filed November 16, 1891. Serial No. 412,028. (No model.)

*To all whom it may concern:*

Be it known that we, FRANK W. MARVIN and GEORGE B. ESSEX, of Detroit, in the county of Wayne and State of Michigan, have invented a new and useful Improvement in Lubricators, of which the following is a specification.

Our invention may be applied to different styles of lubricators; but it is especially designed for use on sight-feed updrop lubricators such as are used on locomotive-engines and provided with an automatic check-valve. In such lubricators, as there is peculiar liability to the breaking of the glass sight-tubes, it has been usual to put in the oil-discharge passage leading away from the sight-feed check-valves opening to permit the outflow of the oil, but closed instantly by the back-pressure of steam in the oil-exit conduit whenever the glass is broken; but the use of check-valves in that connection has been subject to a serious inconvenience that they only permitted the oil to flow out and interfered with the introduction of anything into the sight-feed from above. Sight-feed glasses in use are liable to become coated with impurities or the water itself to become discolored to such an extent as to materially interfere with the examination of the drop as it passes through the sight-feed, and when the engineer desired to clean the glass or put in fresh water it was necessary to shut off the steam from the discharge side of the lubricator, shut off the oil-induction opening, take off the cap or remove whatever may be in the way of access to the check-valve, drain off the water, and refill the glass with fresh water, generally by inserting the point of a very small cup, like an oil-cup, under the check-valve. When the glass was broken, it has been in such cases necessary to take the fitting at the top apart and sometimes to detach it entirely in order to put in a new glass. Our invention is intended to overcome these objections and this loss of time by providing means by which the water can be renewed instantly or the glass replaced with a very little trouble or loss of time.

In the annexed drawings, making a part of this specification, we have exhibited only the sight-feed glass and the fitting attached thereto. The other parts are such as are in common use in lubricators.

Figure 1 is an elevation of the lower half of a sight-feed glass and its fitting and a vertical section of the upper end of the sight-glass and the upper fitting. Fig. 2 is a horizontal section of the upper fitting on the line $x\ x$ of Fig. 1. Fig. 3 is a vertical section of the lower fitting on the line $z\ z$ of Fig. 1.

The same letters are employed in all the figures in the indication of identical parts.

A is a section of the wall of the oil-reservoir of a lubricator such as is in common use, having an annular-cored passage for the oil passing out of the sight-feed.

B is a brass fitting screwed into the oil-reservoir in the usual manner.

C is a plug formed as shown in the drawings, screw-threaded at its widest part, which is in the middle, bored through from end to end, and having an annular recess $C'$ near its lower end and holes $C^2$ connecting such recess with the central interior chamber.

D is a cap screwed onto the upper end of the fitting B, as shown. A hollow bolt G is tapped through the upper end of the cap and is internally threaded to receive a corresponding thread of the screw-plug E, which is tapped through G and extended down into the interior of the plug C. The lower end of this plug is cut away with longitudinal slots near the lower end, which is hollow to receive the stem F of the check-valve, which is fitted onto the seat $F'$ in the lower part of the plug C. A pin $F^2$ is inserted in the stem of the check-valve, as shown in Fig. 1, inside of the cage-formed end of the plug E.

H is the oil-eduction passage leading out from the annular recess $C'$ and connecting through the cored passage in the oil-reservoir with the tallow-pipes. (Not shown.)

I is the sight-glass connected in the usual manner by the cap $D'$ with the lower end of the fitting B.

K is the nipple, on which the drop is formed.

L is the lower fitting, through which the oil is introduced from the oil-reservoir in the usual manner.

$L'$ is the packing-nut, also in common use, for connecting the sight-feed glass with the lower fitting.

M is a plug tapped into the side of the fitting L, pointed at the inner end.

N is a plug tapped through a screw P, extending up into the interior of the fitting L to regulate the amount of oil passing out of the pipe O, which terminates at O' and connects with the tube on the inside of the nipple K.

Q is a blow-off conduit leading out from the chamber at the lower end of the sight-glass I into a chamber at the inner end of the plug M and extended by means of another conduit Q', so as to discharge into the air. This conduit may be opened or closed by means of the plug M.

The operation of this machine is as follows: The oil is introduced through O, passing at O' into the nipple K, the amount of feed being regulated by the screw-plug N. The drop forms on K and gradually increases until it becomes sufficiently buoyant to float up through the water, lifting the check-valve F, passing out through the holes $C^2$ into the annular recess C', flowing around that to the oil-eduction pipe H. This is the usual operation of updrop sight-feed lubricators in common use. If the water or the glass becomes clouded, so as to render observation of the drop as it forms and floats up difficult, the plug N should be turned up onto its seat, so as to shut off the oil, and the plug M drawn back, so as to open the conduit Q Q'. The water, however, would not flow out, for as soon as the conduit Q Q' is opened the steam-pressure will close the check-valve on its seat and there the difficulty commences with the usual construction of sight-feeds which are provided with a check. In our improved device, however, it is not necessary to take the plug out or to shut off the steam. By turning the screw-plug E up its lower end will engage the pin $F^2$ and lift the check-valve F from its seat against the pressure of the steam which will immediately rush in through the pipe H, which is in constant communication with the boiler by means of an equalizing-tube or other means for preventing the disturbance of the due equilibrium of pressure on the two ends of the oil-reservoir. As H is in connection with the annular space C', the steam entering through H will flow around the annular chamber and enter the holes $C^2$, passing then into the interior of the plug and down and under the check-valve F and passing into the sight-glass I, driving the water before it out through the conduit Q Q'. As soon as the water is expelled the steam will rush out of that hole until the inside of the glass is properly washed. When the screw-plug m is turned inward, so as to close the conduit Q Q', the sight-feed chamber will instantly be filled with steam, which will flow in very rapidly and condense until the entire chamber is filled, when the screw-plug E will be turned down, so as to release the check-valve, which will be forced down on its seat by the steam-pressure. Then when the induction-plug N is turned down, so as to open the conduit which carries oil to the nipple K, the oil will commence to be fed, lifting the check-valve from its seat and continuing the supply as before. This entire operation can be conducted in a very short time and without removing any part of the apparatus.

When the sight-feed glass is broken and it is desired to introduce a new one, it is only necessary to shut off the steam from the oil-eduction pipe and the oil from the nipple, unscrew the cap D, screw the plug C out of the fitting, remove the broken glass and put in a new one by slipping it in from above, returning the plug C, and screwing on the cap D. The lubricator is again ready for operation.

We do not claim the parts entering into the usual construction of updrop sight-feed lubricators, nor broadly a slip-joint check-valve independently of the special combination of elements with which it is combined to produce a result not hitherto obtained in any lubricator. Hitherto in order to clean the sight-feed glass when it has been clouded it has been necessary either to draw off the oil from the oil-chamber and to open a valve and permit steam or condensed water to flow through the glass and out through the oil-chamber, which cannot be done where a check-valve is used in the oil-delivery from the sight-feed glass, or in cases where such a check-valve is used to shut off the steam and oil and remove the parts which are connected with the valve and swab out the glass.

Our invention is distinguishable from all others in the introduction of a slip-joint check-valve in the oil-educt from the top of the sight-feed and a blow-off conduit and plug in the fitting at the base of the sight-feed, when by simply shutting off the oil and opening the blow-off a current of steam can be delivered through the glass by merely raising the check-valve from its seat by means of the slip-joint stem of the valve.

Our invention also differs from all previous lubricators in the use of the plug C, which is screwed into the tubular fitting, which is of bore larger than the diameter of the sight-glass, so that the plug may be screwed out of the top of the fitting, leaving its bore entirely unobstructed, so that on its removal a broken sight-glass may be removed and a new one slipped in from above and the plug returned without deranging any of the operative parts, which are all contained in the plug.

What we claim as our invention, and desire to secure by Letters Patent, is—

In combination with the sight-feed glass of a lubricator and oil induction and eduction tubes, a slip-joint check-valve capable of both automatic and positive movement placed in the oil-eduction from the sight-glass, and a blow-off conduit and plug in the fitting at the oil-induction end of the sight-glass for cleaning the glass when the oil is shut off, substantially as set forth.

In testimony whereof we have hereunto subscribed our names in the presence of two attesting witnesses.

F. W. MARVIN.
GEO. B. ESSEX.

Witnesses:
R. MASON,
M. A. HONEY.